United States Patent
Malhotra et al.

[11] Patent Number: 5,714,270
[45] Date of Patent: Feb. 3, 1998

[54] MULTIFUNCTIONAL RECORDING SHEETS

[75] Inventors: Shadi L. Malhotra, Mississauga; Brent S. Bryant, Milton; Yvan Gagnon; Arthur Y. Jones, both of Mississauga, all of Canada

[73] Assignee: Xerox Corporation, Stamford, Conn.

[21] Appl. No.: 610,014

[22] Filed: Mar. 4, 1996

[51] Int. Cl.⁶ .................................................. B41M 5/00
[52] U.S. Cl. ................... 428/537.5; 347/105; 428/195; 428/211; 428/214; 428/216; 428/328; 428/330; 428/331; 428/336; 428/337; 428/500; 428/520; 428/521; 428/522; 428/704
[58] Field of Search ........................ 428/195, 411.1, 428/211, 213–216, 328, 330, 331, 336, 337, 500, 520–522, 537.5, 704

[56] References Cited

U.S. PATENT DOCUMENTS

| | | | |
|---|---|---|---|
| 4,500,607 | 2/1985 | Louden et al. | 428/511 |
| 4,734,336 | 3/1988 | Oliver et al. | 428/537 |
| 5,053,268 | 10/1991 | Ehara et al. | 428/215 |
| 5,223,338 | 6/1993 | Malhotra | 428/342 |
| 5,302,249 | 4/1994 | Malhotra et al. | 162/135 |
| 5,314,747 | 5/1994 | Malhotra et al. | 428/341 |
| 5,320,902 | 6/1994 | Malhotra et al. | 428/342 |
| 5,342,688 | 8/1994 | Kitchin et al. | 428/402 |
| 5,403,955 | 4/1995 | Farooq | 564/15 |
| 5,441,795 | 8/1995 | Malhotra et al. | 428/195 |
| 5,451,458 | 9/1995 | Malhotra | 428/412 |
| 5,451,466 | 9/1995 | Malhotra | 428/500 |
| 5,500,668 | 3/1996 | Malhotra et al. | 347/105 |
| 5,589,269 | 12/1996 | Ali et al. | 428/411.1 |

*Primary Examiner*—Bruce H. Hess
*Attorney, Agent, or Firm*—Judith L. Byorick

[57] ABSTRACT

Disclosed is a recording sheet which comprises (a) a substrate comprising a first paper ply, a second paper ply, and, situated between the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment.

21 Claims, No Drawings

MULTIFUNCTIONAL RECORDING SHEETS

BACKGROUND OF THE INVENTION

The present invention is directed to recording sheets suitable for use in copying and printing applications. More specifically, the present invention is directed to recording sheets suitable for use in both ink jet and electrophotographic imaging processes. One embodiment of the present invention is directed to a recording sheet which comprises (a) a substrate comprising a first paper ply, a second paper ply, and, situated between the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment.

Recording sheets suitable for various printing and imaging processes are known. For example, U.S. Pat. No. 4,500,607 (Louden et al.) discloses a paper which resists significant distortion in planarity in response to moisture which comprises a web which carries a predetermined amount of a polymer-filler blend and which has been dried after application of said blend to a finished moisture level below about 4% by weight.

U.S. Pat. No. 5,053,268 (Ehara et al.), the disclosure of which is totally incorporated herein by reference, discloses a composite paper suitable for use as writing paper, printing paper or copying paper which includes a synthetic resin film having a thickness of 12–30 microns, and a paper sheet laminated on each side of the synthetic resin film and having a Bekk smoothness of 60–120 seconds, a density of 0.8–1.0 g/cm$^3$, a degree of sizing of 0.5–1.5 seconds, and a thickness of 20–25 microns.

U.S. Pat. No. 4,734,336 (Oliver et al.), the disclosure of which is totally incorporated herein by reference, discloses a twin ply uncoated paper for ink jet processes which comprises a supporting paper substrate sheet as a first ply, and thereover as a second ply a paper sheet with filler additives attached to the fibers thereof, which additives are, for example, amorphous synthetic silicas, inorganic silicates, metal alumino-silicates, or inorganic oxides. Three ply papers are also illustrated wherein there is situated between two second plies a supporting substrate sheet.

U.S. Pat. No. 5,223,338 (Malhotra), the disclosure of which is totally incorporated herein by reference, discloses a recording sheet which comprises a substrate and a coating consisting essentially of (1) quaternary ammonium polymers selected from the group consisting of (a) polymers of Formula I

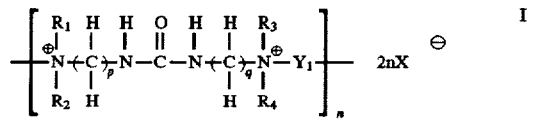

wherein n is an integer of from 1 to about 200, $R_1$, $R_2$, $R_3$, and $R_4$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ is selected from the group consisting of —CH$_2$CH$_2$OCH$_2$CH$_2$—, —CH$_2$CH$_2$OCH$_2$CH$_2$OCH$_2$CH$_2$—, —(CH$_2$)$_k$—, wherein k is an integer of from about 2 to about 10, and —CH$_2$CH(OH)CH$_2$—; (b) polymers of Formula II

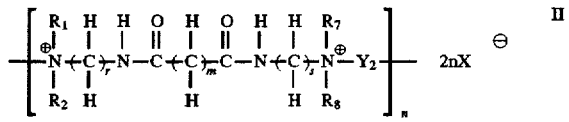

wherein wherein n is an integer of from 1 to about 200, $R_5$, $R_6$, $R_7$, and $R_8$ are each independently selected from the group consisting of alkyl groups, hydroxyalkyl groups, and polyoxyalkylene groups, m is an integer of from 0 to about 40, r is an integer of from 1 to about 10, s is an integer of from 1 to about 10, X is an anion, and $Y_2$ is selected from the group consisting of —CH$_2$CH$_2$OCH$_2$CH$_2$—, —CH$_2$CH$_2$OCH$_2$CH$_2$OCH$_2$CH$_2$—, —(CH$_2$)$_k$—, wherein k is an integer of from about 2 to about 10, and —CH$_2$CH(OH)CH$_2$—; (c) copolymers of Formula III

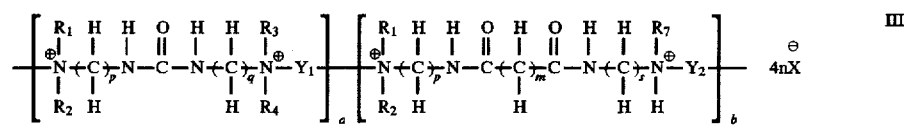

wherein a and b are each integers wherein the sum of a+b is from about 2 to about 200, $R_1$, $R_2$, $R_3$, $R_4$, $R_5$, $R_6$, $R_7$, and $R_8$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ and $Y_2$ are each independently selected from the group consisting of —CH$_2$CH$_2$OCH$_2$CH$_2$—, —CH$_2$CH$_2$OCH$_2$CH$_2$OCH$_2$CH$_2$—, —(CH$_2$)$_k$—, wherein k is an integer of from about 2 to about 10, and —CH$_2$CH(OH)CH$_2$—; (d) mixtures of polymers of Formula I and polymers of Formula II; (e) mixtures of polymers of Formula I and copolymers of Formula III; (f) mixtures of polymers of Formula II and copolymers of Formula III; and (g) mixture of polymers of Formula I, polymers of Formula II, and copolymers of Formula III; (2) an optional binder polymer; and (3) an optional filler.

U.S. Pat. No. 5,302,249 (Malhotra et al.), the disclosure of which is totally incorporated herein by reference, discloses a paper comprising a supporting substrate with a coating which comprises a desizing component and a hydrophilic polymer. In an embodiment the paper comprises a supporting substrate treated with desizing agents selected from the group consisting of (1) hydrophilic poly(dialkylsiloxanes); (2) poly(alkylene glycol); (3) poly(propylene oxide)-poly(ethylene oxide) copolymers; (4) fatty ester modified compounds of phosphate, sorbitan, glycerol, poly(ethylene glycol), sulfosuccinic acid, sulfonic acid and alkyl amine; (5) poly(oxyalkylene) modified compounds of sorbitan esters, fatty amines, alkanol amides, castor oil, fatty acids and fatty alcohols; (6) quaternary alkosulfate compounds; (7) fatty imidazolines; and mixtures thereof.

U.S. Pat. No. 5,314,747 (Malhotra et al.), the disclosure of which is totally incorporated herein by reference, discloses a recording sheet which comprises (a) a base sheet; (b) a cationic sulfur compound selected from the group consisting of sulfonium compounds, thiazolium compounds, benzothiazolium compounds, and mixtures thereof; (c) an optional binder; and (d) an optional pigment.

U.S. Pat. No. 5,320,902 (Malhotra et al.), the disclosure of which is totally incorporated herein by reference, discloses a recording sheet which consists essentially of a substrate and, in contact with the substrate, a monoammonium compound of the formula:

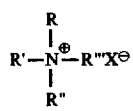

wherein R is an alkyl group, X is selected from the group consisting of fluoride, chloride, bromide, iodide, and astatide, and R', R", and R''' are each independently selected from the group consisting of alkyl groups, substituted alkyl groups, aryl groups, substituted aryl groups, arylalkyl groups, and substituted arylalkyl groups, wherein R, R', R" and R''' are either the same as or different from each other; and mixtures thereof; an optional binder component; and an optional filler component.

U.S. Pat. No. 5,441,795 (Malhotra et al.), the disclosure of which is totally incorporated herein by reference, discloses recording sheet which comprises a base sheet and a material selected from the group consisting of pyridinium compounds, piperazinium compounds, and mixtures thereof.

Copending application 08/075,435, entitled "Multifunctional Recording Sheets," filed Jun. 14, 1993, with the named inventors Shadi L. Malhotra, Brent S. Bryant, Yvan Gagnon, Arthur Y. Jones, David F. Rutland, and Arnold L. Pundsack, the disclosure of which is totally incorporated herein by reference, discloses a recording sheet which comprises a base sheet and a coating mixture comprising (a) a latex binder; (b) a desizing agent; (c) a dye fixative; (d) an optional pigment; and (e) an optional non-latex cobinder.

Copending application U.S. Ser. No. 08/034,917, with the named inventors Shadi L. Malhotra, Brent S. Bryant, and Doris K. Weiss, filed March 19, 1993, entitled "Recording Sheets Containing Phosphonium Compounds," the disclosure of which is totally incorporated herein by reference, discloses a recording sheet which comprises a base sheet, a phosphonium compound, an optional pigment, and an optional binder. In a preferred embodiment, the phosphonium compound is selected from the group consisting of

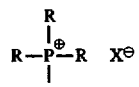

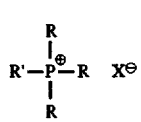

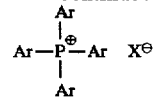

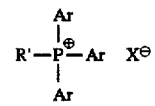

wherein Ar is an aryl group or a substituted aryl group, wherein all three Ar groups are the same, X is an anion, and R' is selected from the group consisting of alkyl groups, substituted alkyl groups, arylalkyl groups, and substituted arylalkyl groups; and mixtures thereof.

U.S. Pat. No. 5,457,486, with the named inventors Shadi L. Malhotra, Brent S. Bryant, and Doris K. Weiss, filed Mar. 19, 1993, entitled "Recording Sheets Containing Tetrazolium, Indolinium, and Imidazolinium Compounds," the disclosure of which is totally incorporated herein by reference, discloses a recording sheet which comprises (a) a base sheet; (b) a material selected from the group consisting of tetrazolium compounds, indolinium compounds, imidazolinium compounds, and mixtures thereof; (c) an optional pigment; and (d) an optional binder.

U.S. Pat. No. 5,500,668, with the named inventors Shadi L. Malhotra, Kurt B. Gundlach, and Richard L. Colt, filed Feb. 15, 1994, entitled "Recording Sheets for Printing Processes Using Microwave Drying," the disclosure of which is totally incorporated herein by reference, discloses a printing process which comprises (a) providing a recording sheet which comprises a substrate, at least one monomeric salt, an optional binder, an optional antistatic agent, an optional biocide, and an optional filler; (b) applying an aqueous recording liquid to the recording sheet in an imagewise pattern; and (c) thereafter exposing the substrate to microwave radiation, thereby drying the recording liquid on the recording sheet.

Copending application U.S. Ser. No. 08/196,922, now abandoned, with the named inventor Shadi L. Malhotra, filed Feb. 15, 1994, entitled "Recording Sheets Containing Alcohols and Saccharides," now abandoned, the disclosure of which is totally incorporated herein by reference, discloses a recording sheet which comprises a substrate and a material selected from the group consisting of monosaccharides, oligosaccharides, and mixtures thereof. Another embodiment of the present invention is directed to a printing process which comprises (a) providing a recording sheet which comprises a substrate, a material selected from the group consisting of monomeric alcohols, monosaccharides, oligosaccharides, and mixtures thereof, an optional binder, an optional antistatic agent, an optional biocide, and an optional filler; (b) applying an aqueous recording liquid to the recording sheet in an imagewise pattern; and (c) thereafter exposing the substrate to microwave radiation, thereby drying the recording liquid on the recording sheet.

U.S. Pat. No. 5,589,277, with the named inventor Shadi L. Malhotra, filed Feb. 15, 1994, entitled "Recording Sheets Containing Amino Acids, Hydroxy Acids, and Polycarboxyl Compounds," the disclosure of which is totally incorporated herein by reference, discloses a recording sheet which comprises a paper substrate and a material selected from the group consisting of monomeric amino acids, monomeric hydroxy acids, monomeric polycarboxyl compounds, and mixtures thereof. Another embodiment of the present invention is directed to a recording sheet which comprises a substrate and an additive material selected from the group consisting of monomeric amino acids, monomeric hydroxy acids, and mixtures thereof.

Copending application U.S. Ser. No. 08/196,607, with the named inventor Shadi L. Malhotra, filed Feb. 15, 1994, entitled "Recording Sheets Containing Amine Salts and Quaternary Choline Halides," the disclosure of which is totally incorporated herein by reference, discloses a recording sheet which comprises a substrate and a material selected from the group consisting of monomeric amine acid salts, monomeric quaternary choline halides, and mixtures thereof.

Copending application U.S. Ser. No. 08/196,676, with the named inventor Shadi L. Malhotra, filed Feb. 15, 1994, entitled "Recording Sheets Containing Pyrrole, Pyrrolidine, Pyridine, Piperidine, Homopiperidine, Quinoline, Isoquinoline, Quinuclidine, Indole, and Indazole Compounds," the disclosure of which is totally incorporated herein by reference, discloses a recording sheet which comprises a substrate and an additive material selected from the group consisting of pyrrole compounds, pyrrolidine compounds, pyridine compounds, piperidine compounds, homopiperidine compounds, quinoline compounds, isoquinoline compounds, quinuclidine compounds, indole compounds, indazole compounds, and mixtures thereof.

Copending application U.S. Ser. No. 08/196,933, with the named inventor Shadi L. Malhotra, filed Feb. 15, 1994, entitled "Recording Sheets Containing Purine, Pyrimidine, Benzimidazole, Imidazolidine, Urazole, Pyrazole, Triazole, Benzotriazole, Tetrazole, and Pyrazine Compounds," the disclosure of which is totally incorporated herein by reference, discloses a recording sheet which comprises a substrate and a material selected from the group consisting of purine compounds, pyrimidine compounds, benzimidazole compounds, imidazolidine compounds, urazole compounds, pyrazole compounds, triazole compounds, benzotriazole compounds, tetrazole compounds, pyrazine compounds, and mixtures thereof. Also disclosed is a recording sheet which consists essentially of a substrate, at least one material selected from the group consisting of purine compounds, pyrimidine compounds, benzimidazole compounds, imidazolidine compounds, urazole compounds, pyrazole compounds, triazole compounds, benzotriazole compounds, tetrazole compounds, pyrazine compounds, and mixtures thereof, an optional binder, an optional antistatic agent, an optional biocide, and an optional filler.

Copending application U.S. Ser. No. 08/196,672, with the named inventor Shadi L. Malhotra, filed Feb. 15, 1994, entitled "Recording Sheets Containing Oxazole, Isooxazole, Oxazolidinone, Oxazoline Salt, Morpholine, Thiazole, Thiazolidine, Thiadiazole, and Phenothiazine Compounds," the disclosure in by which is totally incorporated herein by reference, discloses a recording sheet which comprises a substrate and a material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof. Also disclosed is a recording sheet which consists essentially of a substrate, at least one material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof, an optional binder, an optional antistatic agent, an optional biocide, and an optional filler.

In forming paper, the cellulose fibers are dispersed in a dilute aqueous slurry which is wet laid as a mat or web onto the screen of a conventional Fourdrinier-type machine. After the web has been dewatered, it is dried to a predetermined moisture level upstream of the size press. Paper is often sized with sizing components for the purpose of retarding or preventing penetration of liquids into the structure. Sizing is commonly done by introducing a material into the pulp during the paper making operation. The acid sizing chemicals, such as Mon size available from Monsanto, or alkaline sizing chemicals, such as Hercon-76 available from Hercules, are precipitated onto the fibers primarily for the purpose of controlling penetration of liquids into the final dry paper. This process is known as internal sizing. Surface sizing entails the application of dispersions of film-forming substances such as converted starches, gums, and modified polymers to previously formed paper. Surface sizing imparts strength to the paper; thus high quality printing papers are often surface sized as well. These internally and surface sized papers, when used to print high area (at least about 80 percent, for example) surface coverage with an ink jet printer containing predominantly water based inks, often yield imaged papers which curl into tubes. Furthermore, when these conventional papers are used in color xerography applications, such as, for example, in a Xerox® 5775 color copier, these sized papers exhibit unacceptable curl because of the uneven moisture balance between the printed side and the nonprinted side of the paper once it exits from the copier.

When plain papers are treated with components to improve the quality of ink jet prints thereon, the papers so treated still show unacceptable curl when employed in electrostatic (particularly electrophotographic) copiers. In addition, when plain papers are treated with components to improve the quality of ink jet prints thereon, these papers still exhibit problems when the imaged sheets contact water. If one side of the imaged sheet comes into contact with water, the image migrates through the sheet and interferes with the image on the other side. In some instances, the showthrough of the washed image is so enhanced that the back side of the paper has more ink than the front side of the paper. Further, in some instances, paper treatment methods which improve intercolor bleed problems in color ink jet images may heighten the severity of showthrough of the images on the side of the paper opposite to that printed. Additionally, many plain papers exhibit inadequate or nonuniform toner fix when imaged with electrostatic toners.

While known compositions and processes are suitable for their intended purposes, a need remains for improved paper recording sheets. In addition, there is a need for improved paper recording sheets suitable for use in both ink jet printing processes and electrostatic printing processes. Further, a need remains for paper recording sheets for ink jet printing wherein images on the sheets exhibit a high degree of waterfastness. A need also exists for paper recording sheets suitable for use in ink jet printing processes wherein images on the sheets exhibit reduced curl. There is also a need for paper recording sheets suitable for use in. electrostatic printing processes wherein images on the sheets exhibit reduced curl. A further need exists for paper recording sheets suitable for use in both ink jet printing processes and electrostatic printing processes wherein images on the sheets exhibit reduced curl. Additionally, there is a need for paper recording sheets for ink jet printing which exhibit reduced showthrough of the images on the side of the paper opposite to that printed. There is also a need for paper recording sheets for ink jet printing with enhanced optical density. In addition, there is a need for paper recording sheets for ink jet printing which exhibit reduced intercolor bleed. Further, there is a need for paper recording sheets for electrostatic printing processes such as electrophotography which exhibit good toner fix of the image to the sheet. Additionally, there is a need for paper recording sheets suitable for both ink jet printing processes and electrostatic printing processes which exhibit reduced intercolor bleed and reduced showthrough when used for ink jet printing and which exhibit reduced curl and good toner fix when used for electrostatic printing. There is also a need for paper recording sheets which, when employed to receive electrostatically generated images of a toner, do not, upon being contacted with water, exhibit migration of the image through the sheet to cause showthrough on the sheet surface opposite to that bearing the wetted image. A further need remains for paper recording sheets which, when employed to receive images of an aqueous ink, do not, upon being contacted with water, exhibit migration of the image through the sheet to cause showthrough on the sheet surface opposite to that bearing the wetted image. Additionally, a need remains for paper recording sheets suitable for both ink jet printing processes and electrostatic printing processes which do not, upon being contacted with water, exhibit migration of the image through the sheet to cause showthrough on the sheet surface opposite to that bearing the wetted image. There is also a need for paper recording sheets which enable the generation of ink jet images of acceptable quality and little or no showthrough when images are generated on both surfaces of the recording sheet.

SUMMARY OF THE INVENTION

It is an object of the present invention to provide paper recording sheets with the above noted advantages.

It is another object of the present invention to provide improved paper recording sheets suitable for use in both ink jet printing processes and electrostatic printing processes.

It is yet another object of the present invention to provide paper recording sheets for ink jet printing wherein images on the sheets exhibit a high degree of waterfastness.

It is still another object of the present invention to provide paper recording sheets suitable for use in ink jet printing processes wherein images on the sheets exhibit reduced curl.

Another object of the present invention is to provide paper recording sheets suitable for use in electrostatic printing processes wherein images on the sheets exhibit reduced curl.

Yet another object of the present invention is to provide paper recording sheets suitable for use in both ink jet printing processes and electrostatic printing processes wherein images on the sheets exhibit reduced curl.

Still another object of the present invention is to provide paper recording sheets for ink jet printing which exhibit reduced showthrough of the images on the side of the paper opposite to that printed.

It is another object of the present invention to provide paper recording sheets for ink jet printing with enhanced optical density.

It is yet another object of the present invention to provide paper recording sheets for ink jet printing which exhibit reduced intercolor bleed.

It is still another object of the present invention to provide paper recording sheets for electrostatic printing processes such as electrophotography which exhibit good toner fix of the image to the sheet.

Another object of the present invention is to provide paper recording sheets suitable for both ink jet printing processes and electrostatic printing processes which exhibit reduced intercolor bleed and reduced showthrough when used for ink jet printing and which exhibit reduced curl and good toner fix when used for electrostatic printing.

Yet another object of the present invention is to provide paper recording sheets which, when employed to receive electrostatically generated images of a toner, do not, upon being contacted with water, exhibit migration of the image through the sheet to cause showthrough on the sheet surface opposite to that bearing the wetted image.

Still another object of the present invention is to provide paper recording sheets which, when employed to receive images of an aqueous ink, do not, upon being contacted with water, exhibit migration of the image through the sheet to cause showthrough on the sheet surface opposite to that bearing the wetted image.

It is another object of the present invention to provide paper recording sheets suitable for both ink jet printing processes and electrostatic printing processes which do not, upon being contacted with water, exhibit migration of the image through the sheet to cause showthrough on the sheet surface opposite to that bearing the wetted image.

It is yet another object of the present invention to provide paper recording sheets which enable the generation of ink jet images of acceptable quality and little or no showthrough when images are generated on both surfaces of the recording sheet.

These and other objects of the present invention (or specific embodiments thereof) can be achieved by providing a recording sheet which comprises a recording sheet which comprises (a) a substrate comprising a first paper ply, a second paper ply, and, situated between the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment.

DETAILED DESCRIPTION OF THE INVENTION

In one embodiment of the present invention, the paper plies of the substrate comprise sized blends of hardwood kraft and softwood kraft fibers containing from about 10 to 90 percent by weight soft wood and from about 10 to about 90 percent by weight hardwood. Examples of hardwood include Seagull W dry bleached hardwood kraft, present in one embodiment in an amount of about 70 percent by weight. Examples of softwood include La Tuque dry bleached softwood kraft, present in one embodiment in an amount of about 30 percent by weight. These paper plies can also contain fillers and pigments in any effective amounts, typically from about 1 to about 75 percent by weight, such as clay (available from Georgia Kaolin Company, Astro-fil 90 clay, Engelhard Ansilex clay), titanium dioxide (available from Tioxide Company—Anatase grade AHR), calcium silicate CH-427-97-8, XP-974 (J.M. Huber Corporation), and the like. The sized substrates can also contain sizing chemicals in any effective amount, typically from about 0.25 percent to about 25 percent by weight of pulp, such as acidic sizing, including Mon size (available from Monsanto), alkaline sizing such as Hercon-76 (available from Hercules), Alum (available from Allied Chemicals as Iron free alum), retention aid (available from Allied Colloids as Percol 292), and the like. Preferred basis weights for the paper plies are from about 40 to about 400 grams per square meter, although the basis weight can be outside of this range.

In another embodiment the paper plies of the present invention can contain a synthetic resin such as an acrylic latex polymer or a styrene-butadiene copolymer or the like. Examples of suitable resins include vinyl acetate copolymer latices, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Co, Synthemul 97-726 from Reichhold Chemicals Inc., Resyn 25-1140, 25-1141, 25-1142, and Resyn-6820 from National Starch and Chemical Corporation, vinyl acrylic terpolymer latices, such as 76 RES 3103 from Union Oil Chemical Division and Resyn 25-1110 from National Starch and Chemical Corporation, acrylic emulsion latices, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company and Hycar 2600 X 322, Hycar 2671, Hycar 2679, Hycar 26120, and Hycar 2600 X347 from B. F. Goodrich Chemical Group, styrene-butadiene latices, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A from Dow Chemical Company, and the like, as well as mixtures thereof. The resin is incorporated into the paper plies by first preparing the paper fiber mixture and subsequently adding to the slurry the desired resin, followed by mixing. The paper sheets are then formed, pressed, and dried.

The first paper ply of the recording sheet is coated on one surface with an adhesive polymer capable of forming a latex. Optionally, the adhesive composition also contains a pigment and/or one or more non-latex cobinder polymers. The adhesive layer is of any effective thickness. Typically the thickness is from about 1 to about 10 microns, and preferably from about 5 to about 10 microns, although the thickness can be outside these ranges. The components of the adhesive layer are present in any effective relative amounts. Typically, when components other than the latex polymer are present in the adhesive layer, the latex polymer is present in an amount of from about 5 to about 95 percent by weight, and preferably from about 10 to about 50 percent by weight, although the amount can be outside these ranges. Typically, the optional pigment is present in an amount of from about 5 to about 50 percent by weight, and preferably from about 10 to about 30 percent by weight, although the amount can be outside these ranges. Typically, the optional non-latex cobinder polymer in the adhesive layer is present in an amount of from about 5 to about 35 percent by weight, and preferably from about 10 to about 25 percent by weight, although the amount can be outside these ranges.

The polymer capable of forming a latex is, for the purposes of the present invention, a polymer that forms in water or in an organic solvent a stable colloidal system in which the disperse phase is polymeric. Examples of suitable latex-forming polymers include rubber latices, such as neoprene available from Serva Biochemicals, polyester latices, such as Eastman AQ 29D available from Eastman Chemical Company, vinyl chloride latices, such as Geon 352 from B. F. Goodrich Chemical Group, ethylene-vinyl chloride copolymer emulsions, such as Airflex ethylene-vinyl chloride from Air Products and Chemicals, poly vinyl acetate homopolymer emulsions, such as Vinac from Air Products and Chemicals, carboxylated vinyl acetate emulsion resins, such as Synthemul synthetic resin emulsions 40-502, 40-503, and 97-664 from Reichhold Chemicals Inc. and Polyco 2149, 2150, and 2171, from Rohm and Haas Co., vinyl acetate copolymer latices, such as 76 RES 7800 from Union Oil Chemicals Divisions and Resyn 25-1103, Resyn 25-1109, Resyn 25-1119, and Resyn 25-1189 from National Starch and Chemical Corporation, ethylene-vinyl acetate copolymer emulsions, such as Airflex ethylene-vinylacetate from Air Products and Chemicals Inc., acrylic-vinyl acetate copolymer emulsions, such as Rhoplex AR-74 from Rohm and Haas Co, Synthemul 97-726 from Reichhold Chemicals Inc., Resyn 25-1140, 25-1141, 25-1142, and Resyn-6820 from National Starch and Chemical Corporation, vinyl acrylic terpolymer latices, such as 76 RES 3103 from Union Oil Chemical Division and Resyn 25-1110 from National Starch and Chemical Corporation, acrylic emulsion latices, such as Rhoplex B-15J, Rhoplex P-376, Rhoplex TR-407, Rhoplex E-940, Rhoplex TR-934, Rhoplex TR-520, Rhoplex HA-24, and Rhoplex NW-1825 from Rohm and Haas Company and Hycar 2600 X 322, Hycar 2671, Hycar 2679, Hycar 26120, and Hycar 2600 X347 from B. F. Goodrich Chemical Group, polystyrene latices, such as DL6622A, DL6688A, and DL6687A from Dow Chemical Company, styrene-butadiene latices, such as 76 RES 4100 and 76 RES 8100 available from Union Oil Chemicals Division, Tylac resin emulsion 68-412, Tylac resin emulsion 68-067, 68-319, 68-413, 68-500, 68-501, available from Reichhold Chemical Inc., and DL6672A, DL6663A, DL6638A, DL6626A, DL6620A, DL615A, DL617A, DL620A, DL640A, DL650A from Dow Chemical Company, butadiene-acrylonitrile latices, such as Hycar 1561 and Hycar 1562 from B. F. Goodrich Chemical Group and Tylac Synthetic Rubber Latex 68-302 from Reichhold Chemicals Inc., butadiene-acrylonitrile-styrene terpolymer latices, such as Tylac synthetic rubber latex 68-513 from Reichhold Chemicals Inc., and the like, as well as mixtures thereof. The hydrophobic adhesive repels aqueous ink compositions such as those typically used in thermal ink jet printing processes and prevents an aqueous ink composition applied to one ply from passing through the hydrophobic adhesive layer to the other ply.

The first ply can be coated with the hydrophobic adhesive layer by any desired method, including slot extrusion or the like, to form a continuous film of the coating evenly distributed across one surface of the first ply. The surface of the first ply coated with the adhesive is then placed in contact with the second ply and the adhesive is dried, with bonding generally being accomplished with heat and/or pressure. The bonding temperature typically is from about 75° to about 150° C., and preferably from about 100° to about 125° C., although the temperature can be outside these ranges. The bonding pressure typically is from about 40 to about 100 psi, and preferably from about 60 to about 90 psi, although the pressure can be outside these ranges.

The substrates of the present invention can be of any effective thickness. Typical thickness of the two-ply substrate prior to applying the coating material varies from about 50 to about 150 microns, and preferably from about 75 to about 125 microns, although the thickness can be outside these ranges. Typical thicknesses for each paper ply of the recording sheet varies from about 15 to about 125 microns, and preferably from about 25 to about 75 microns, although the thickness can be outside these ranges.

After bonding, the recording sheet substrate is subjected to size press treatment or some other coating process to apply a coating to at least one surface thereof. If the same coating is to be applied to both surfaces of the sheet, size press treatment or dip coating may be preferred methods, whereas if a coating is to be applied to only one surface of the sheet, extrusion coating may be preferred. The coating composition comprises a binder, a dye fixative, and, optionally, a pigment. In the coating composition, the binder typically is present in an amount of from about 5 to about 95 percent by weight, and preferably from about 10 to about 50 percent by weight, although the amount can be outside these ranges. The dye fixative typically is present in an amount of from about 2 to about 10 percent by weight, and preferably from about 3 to about 8 percent by weight, although the amount can be outside these ranges. The pigment, if present, is typically present in an amount of from about 1 to about 75 percent by weight, and preferably from about 10 to about 70 percent by weight, although the amount can be outside these ranges.

Examples of binders include (a) hydrophilic polysaccharides and their modifications, such as (1) starch (such as starch SLS-280, available from St. Lawrence starch), (2) cationic starch (such as Cato-72, available from National Starch), (3) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (6) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocol, available from Berol Kern. A. B. Sweden)), (8) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A. G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl alextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc), (19) carboxy alkyl cellulose salts, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) Karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agaragar (such as that available from Pfaltz and Bauer Inc.), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxyalkyl cellulose salts, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company); (b) vinyl polymers, such as (1) poly(vinyl alcohol) (such as Elvanol available from Dupont Chemical Company), (2) poly (vinyl phosphate) (such as #4391 available from Poly Sciences Inc.), (3) poly (vinyl pyrrolidone) (such as that available from GAF Corporation), (4) vinyl pyrrolidone-vinyl acetate copolymers (such as #02587, available from Poly Sciences Inc.), (5) vinyl pyrrolidone-styrene copolymers (such as #371, available from Scientific Polymer Products), (6) poly (vinylamine) (such as #1562, available from Poly Sciences Inc.), (7) poly (vinyl alcohol) alkoxylated, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl alcohol) ethoxylated #6573, available from Poly Sciences Inc.), and (8) poly (vinyl pyrrolidone-dialkylaminoalkyl alkylacrylate), wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl pyrrolidone-diethylaminomethylmethacrylate) #16294 and #16295, available from Poly Sciences Inc.); (c) formaldehyde resins, such as (1) melamine-formaldehyde resin (such as BC 309, available from British Industrial Plastics Limited), (2) urea-formaldehyde resin (such as BC777, available from British Industrial Plastics Limited), and (3) alkylated urea-formaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); (d) ionic polymers, such as (1) poly (2-acrylamide-2-methyl propane sulfonic acid) (such as #175 available from Scientific Polymer Products), (2) poly (N,N-dimethyl-3,5-dimethylene piperidinium chloride) (such as #401, available from Scientific Polymer Products), and (3) poly (methylene-guanidine) hydrochloride (such as #654, available from Scientific Polymer Products); (e) maleic anhydride and maleic acid containing polymers, such as (1) styrene-maleic anhydride copolymers (such as that available as Scripset from Monsanto, and the SMA series available from Arco), (2) vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), (3) alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), (4) butadiene-maleic acid copolymers (such as #07787, available from Poly Sciences Inc.), (5) vinylalkylether-maleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporationas Gantrez S-95), and (6) alkyl vinyl ether-maleic acid esters, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether-maleic acid ester #773, available from Scientific Polymer Products); (f) acrylamide containing polymers, such as (1) poly (acrylamide) (such as #02806, available from Poly Sciences Inc.), (2) acrylamide-acrylic acid copolymers (such as #04652, #02220, and #18545, available from Poly Sciences Inc.), and (3) poly (N,N-dimethyl acrylamide) (such as #004590, available from Poly Sciences Inc.); and (g) poly (alkylene imine) containing polymers, wherein alkylene has two (ethylene), three (propylene), or four (butylene) carbon atoms, such as (1) poly(ethylene imine) (such as #135, available from Scientific Polymer Products), (2) poly (ethylene imine) epichlorohydrin (such as #634, available from Scientific Polymer Products), and (3) alkoxylated poly (ethylene imine), wherein alkyl has one (methoxylated), two (ethoxylated), three (propoxylated), or four (butoxylated) carbon atoms (such as ethoxylated poly (ethylene imine #636, available from Scientific Polymer Products); and the like, as well as blends or mixtures of any of the above, with starches and latexes being particularly preferred because of their availability and applicability to paper. Any mixtures of the above ingredients in any relative amounts can be employed.

Examples of suitable dye fixatives include quaternary acrylic copolymer latexes, particularly those of the formula

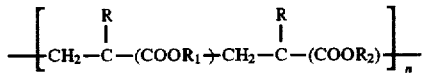

wherein n is a number of from about 10 to about 100, and preferably about 50, R is hydrogen or methyl, $R_1$ is hydrogen, an alkyl group, preferably with from 1 to about 20 carbon atoms, or an aryl group, preferably with from about 6 to about 14 carbon atoms, and $R_2$ is $N^+(CH_3)_3X^-$, wherein X is an anion, such as $Cl^-$, $Br^-$, $I^-$, $HSO_3^-$, $SO_3^{2-}$, $CH_2SO_3^-$, $H_2PO_4^-$, $HPO_4^{2-}$, $PO_4^{3-}$, $HSO_4^-$, $SO_4^{2-}$, $NO_3^-$, $HCOO^-$, $CH_3COO^-$, $HCO_3^-$, $CO_3^{2-}$, $SCN^-$, $BF_4^-$, $ClO_4^-$, $SSO_3^-$, $CH_3SO_3^-$, $CH_3CH_2SO_3^-$, $CH_3C_6H_4SO_3^-$, $SO_3^{2-}$, $BrO_3^-$, $IO_3^-$, $ClO_3^-$, or the like, and the degree of quaternization is from about 1 to about 100 percent, including polymers such as polymethyl acrylate trimethyl ammonium chloride latex, such as HX42-1, available from Interpolymer Corp., formaldehyde-free Gardol DR/NF™, available from Apollo Chemical Corporation, poly quaternary amine Perchem 553™, available from Chem link industrial, poly quaternary amine, poly plus 1290™, available from Betz Paper Chem Inc; Armosoft 420-90™, available from Akzo Chemie Chemicals, Mirapol A-15 and Mirapol WT, available from Miranol, Incorporated, Dayton, N.J., prepared as disclosed in U.S. Pat. No. 4,157,388, the disclosure of which is totally incorporated herein by reference, Mirapol AZ-1, available from Miranol, Incorporated, prepared as disclosed in U.S. Pat. No. 4,719,282, the disclosure of which reference, incorporated herein by reference, Mirapol AD-1, available from Miranol, Incorporated, prepared as disclosed in U.S. Pat. No. 4,157,388, Mirapol 9, Mirapol 95, and Mirapol 175, available from Miranol, Incorporated, Dayton, N.J., prepared as disclosed in U.S. Pat. No. 4,719,282, and the like, as well as mixtures thereof.

Also suitable are monoammonium compounds as disclosed in, for example, U.S. Pat. No. 5,320,902, the disclosure of which is totally incorporated herein by reference, including those of the formula:

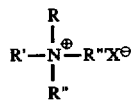

wherein R is an alkyl group, preferably with from 1 to about 25 carbon atoms, such as methyl, ethyl, n-propyl, isopropyl, n-butyl, isobutyl, hexyl, and the like, and including cyclic alkyl groups, such as cyclopropyl, cyclohexyl, and the like, and including unsaturated alkyl groups, such as vinyl ($H_2C=CH-$), allyl ($H_2CH=CH-CH_2-$), propynyl ($HC\equiv C-CH_2-$), and the like, X is an anion, such as $Cl^-$, $Br^-$, $I^-$, $HSO_3^-$, $SO_3^{2-}$, $CH_2SO_3^-$, $H_2PO_4^-$, $HPO_4^{2-}$, $PO_4^{3-}$, $HSO_4^-$, $SO_4^{2-}$, $NO_3^-$, $HCOO^-$, $CH_3COO^-$, $HCO_3^-$, $CO_3^{2-}$, $SCN^-$, $BF_4^-$, $ClO_4^-$, $SSO_3^-$, $CH_3SO_3^-$, $CH_3CH_2SO_3^-$, $CH_3C_6H_4SO_3^-$, $SO_3^{2-}$, $BrO_3^-$, $IO_3^-$, $ClO_3^-$, like, and R', R", and R'" are each independently selected from the group consisting of alkyl groups, preferably with from 1 to about 25 carbon atoms, such as methyl, ethyl, n-propyl, isopropyl, n-butyl, isobutyl, hexyl, and the like, and including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, substituted alkyl groups, preferably with from 1 to about 25 carbon atoms, aryl groups, preferably with from 6 to about 25 carbon atoms, such as phenyl, naphthyl, and the like, substituted aryl groups, preferably with from 6 to about 25 carbon atoms, arylalkyl groups, preferably with from 7 to about 25 carbon atoms, such as benzyl, and substituted arylalkyl groups, preferably with from about 7 to about 25 carbon atoms, wherein R, R', R" and R'" are either the same as or different from each other. Examples of suitable substituents on the substituted alkyl, aryl, and arylalkyl groups include hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, silyl groups, and the like.

Specific examples include (A) tetra alkyl ammonium salts, such as those of the general formula $R_4N^+X^-$, wherein X is an anion as indicated above and R is an alkyl or substituted alkyl group as indicated above, including tetramethyl ammonium bromide (Aldrich 19,575-8), tetramethyl ammonium chloride (Aldrich T1,952-6), tetramethyl ammonium iodide (Aldrich 23,594-6), tetraethyl ammonium bromide (Aldrich 24,105-9), tetraethyl ammonium chloride (Aldrich 11304-2), tetraethyl ammonium iodide (Aldrich 23,593-8), tetrapropyl ammonium bromide (Aldrich 22,556-8), tetrapropyl ammonium iodide (Aldrich 23,595-4), tetrabutyl ammonium bromide (Aldrich 19,311-9), tetrabutyl ammonium chloride (Aldrich 28,888-8), tetrabutyl ammonium iodide (Aldrich 14,077-5), tetrapentyl ammonium bromide (Aldrich 24,197-0), tetrapentyl ammonium chloride (Aldrich 25,896-2), tetrahexyl ammonium chloride (Aldrich 26,383-4), tetrahexyl ammonium bromide (Aldrich 25,281-6), tetrahexyl ammonium iodide (Fluka 87307), tetrahexyl ammonium hydrogen sulfate (Fluka 87299), tetraheptyl ammonium bromide (Aldrich 23,784-1), tetraoctyl ammonium bromide (Aldrich 29,413-6), tetradecyl ammonium bromide (Fluka 87582), tetradodecyl ammonium bromide (Fluka 87249), tetrahexadecyl ammonium bromide (Fluka 87298), tetraoctadecyl ammonium bromide (Aldrich 35,873-8), and the like; (B) monosubstituted trialkyl ammonium salts, such as those of the general formula $R'R_3N^+X^-$, wherein X is an anion as indicated above, R is an alkyl or substituted alkyl group as indicated above, and R' is an alkyl, substituted alkyl, aryl, substituted aryl, arylalkyl, or substituted arylalkyl group as indicated above, including 2-aminoethyl trimethyl ammonium chloride hydrochloride (Aldrich 28,455-6), 2-bromoethyl trimethyl ammonium bromide (Aldrich 11,719-6), 2-chloroethyl trimethyl ammonium chloride (Aldrich 23,443-5), hexamethylene bistrimethyl ammonium bromide (Aldrich 21,967-3, Fluka 52590), hexamethylene bistrimethyl ammonium chloride (Fluka 52600), 3-carboxypropyl ammonium chloride (Aldrich 23,443-5), [3-(methacryloyl amino) propyl] trimethyl ammonium chloride (Aldrich 28,065-8), of the formula

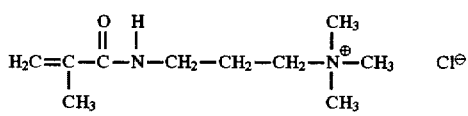

decamethylene bis trimethyl ammonium bromide, of the formula [—(CH$_2$)$_5$—N(CH$_3$)$_3$Br]$_2$ (Aldrich 28,547-1), phenyl trimethyl ammonium bromide (Aldrich 13,532-1), phenyl trimethyl ammonium chloride (Aldrich 19,916-8), phenyl trimethyl ammonium iodide (Aldrich 13,914-9), phenyl trimethyl ammonium methosulfate (Aldrich 25,943-6), benzyl trimethyl ammonium chloride (Aldrich 22,557-6, Hipochem Migrator J from High Point Chemical Corporation, Variquat B200 from Sherex Chemicals), benzyl trimethyl ammonium bromide (Aldrich 14,711-7), benzyl triethyl ammonium chloride (Aldrich 14,655-2), benzyl triethyl ammonium bromide (Aldrich 14,712), benzyl tributyl ammonium chloride (Aldrich 19,377-1), benzyl tributyl ammonium bromide (Aldrich 24,378-7), benzyl tributyl ammonium iodide (Aldrich 29,301-6), 4-nitrobenzyl trimethyl ammonium chloride (Aldrich 29,369-5), [2-(4-nitrophenyl) allyl] trimethyl ammonium iodide (Aldrich 30,217-1), of the formula

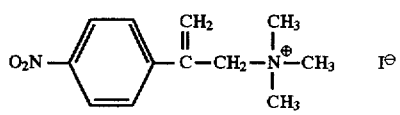

coco trimethyl ammonium chloride (Arquad C-33, C-33W, C-50 from Akzo Chemie, Noramium MC-50 from Diamond Shamrock, Jet Quat C-50 from Jetco Chemicals, Quartamin CPR from Kao Corporation), palmityl trimethyl ammonium chloride (Adogen 444 from Sherex Chemicals), myristyl trimethyl ammonium bromide (Aldrich 86,042-5), Cetrimide BP Triple Crown America), oleyl trimethyl ammonium chloride (Noramium MO-50 from Diamond Shamrock), soya trimethyl ammonium chloride (Arquad S-20 Akzo Chemie, Jet Quat S-2C-50 Jetco Chemicals, Tomah Q-S from Tomah), tallow trimethyl ammonium chloride (Arquad T-50, T-27W Akzo Chemie, Jet Quat T-50 Jetco Chemicals, Quartamin TPR from Kao Corp, Radiaquat 6471 from Oleofina S.A., Adogen 471 from Sherex Chemicals, Querton BGCL50 from Kenobel), hydrogenated tallow trimethyl ammonium chloride (Noramium MSH-50 from Diamond Shamrock, Quartamin HTPR from Kao Corp, Adogen 441 from Sherex Chemicals), ricinoleamidopropyl trimethyl ammonium methyl sulfate (Rewoquat RTM50, Rewo Quimica), stearyl trimethyl ammonium chloride (Arquad 18-50 from Akzo Chemie), behenyl trimethyl ammonium chloride (Incroquat TMC/P; Croda Universal Inc), behenyl trimethyl ammonium methosulfate (Incroquat TMS; Croda Universal Inc), guar hydroxypropyl trimethyl ammonium chloride (cationic guar C-261 from Henkel), butyl tripropyl ammonium bromide (Aldrich 28038-0), methyl tributyl ammonium chloride (Aldrich 25,516-5), methyl tributyl ammonium bromide (Fluka 90802), methyl tributyl ammonium iodide (Fluka 90804), heptyl tributyl ammonium bromide (Fluka 90797), and the like; (C) disubstituted dialkyl ammonium salts, such as those of the general formula R'R"R$_2$N$^+$X$^-$, wherein X is an anion as indicated above, R is an alkyl or substituted alkyl group as indicated above, and R' and R" each, independently of the other, is an alkyl, substituted alkyl, aryl, substituted aryl, arylalkyl, or substituted arylalkyl group as indicated above, including N,N-dimethyl methylene ammonium chloride (Aldrich 32,449-3), N,N-dimethyl methylene ammonium iodide (Aldrich 21,491-4), chloromethylene dimethyl ammonium chloride (Aldrich 28,090-9), dichloromethylene dimethyl ammonium chloride (Aldrich 16,287-6), 1,5-dimethyl-1,5-diaza undecamethylene polymethobromide (hexadimethrine bromide, Aldrich 10,768-9), such as dimethyl amino methylene amino methylene dimethyl ammonium chloride (Golds Reagent Aldrich 28,907-8), of the formula

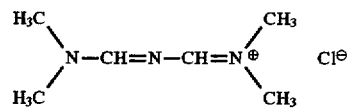

benzethonium chloride (Aldrich B470-8), of the formula

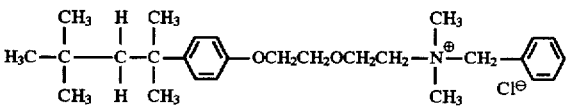

methyl benzethoniumchloride (Aldrich 28,659), of the formula

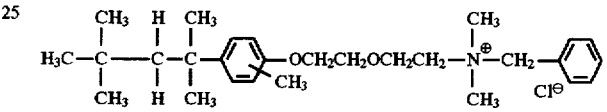

1-propanaminium 2,3-dihydroxy-N-di methyl-N-[3 (oxococoyl)amino]propyl]-chloride (Lexquat AMG-WC from Index Chemical Corporation), cetyl dimethyl ethyl ammonium bromide (Aldrich 22,899-0), octyl dodecyl dimethyl ammonium chloride (BTC812 from Onyx), dodecyl (2-hydroxy-1-methyl-2-phenyl-ethyl) dimethyl ammonium bromide (also called N-dodecyl N-methyl ephedrinium bromide) (Aldrich 23,540-7), of the formula

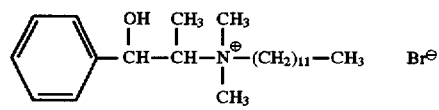

dodecyl dimethyl-2-phenoxyethyl) ammonium bromide (domiphen bromide Aldrich 24,748-0), of the formula

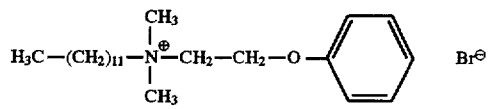

dodecanoyl-N-methylamino ethyl-(phenyl carbamyl methyl) dimethyl ammonium chloride (Desogen from Ciba Geigy PLC), 3-chloro-2-hydroxypropyl N,N,N-dimethyl alkyl ammonium chloride, where alkyl is dodecyl (Quab 342 from Degussa), of the formula

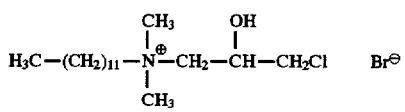

or where alkyl is octadecyl (Quab 426 from Degussa), dodecyl benzyl dimethyl ammonium bromide (Aldrich 28,088-7), dodecyl benzyldimethyl ammonium chloride (Loraquat B50 Dutton and Reinisch Ltd., Retartder N from Hart Chemicals), coco benzyl dimethylammonium chloride (Merpiquat K-8-2 from Kempen; Nissan cation F2-10R, F2-20R, F2-40E, F2-50 from Nippon Oils and Fats; Querton KKBCL from Lilachim), benzyl tetradecyl dimethyl ammonium chloride (Arquad DM 14B-90 from Akzo Chemie, Variquat 50ME, 80ME from Sherex Chemicals, Cyncal, Hilton-Davis Chemicals, Aldrich 29,279-6), benzyl cetyl dimethyl ammonium chloride (Querton 16BCL from Lilachim, Aldrich 22,900-8), benzyl octadecyl dimethyl ammonium chloride (Arquad DM 18B-90 Akzo Chemie, Varisoft 6112 from Sherex Chemicals, Nissan Cation S2-100 from Nippon Oils and Fats, Carsosoft SDQ-25, SDQ-85 from Lonza Inc, Aldrich 22,901-6), benzyl tallow dimethyl ammonium chloride (Kemamine BQ-9742C from Witco Chemicals and Noramium S-75 from Diamond Shamrock), benzyl hydrogenated tallow dimethyl ammonium chloride (Arquad DMHTB-75 from Akzo Chemie, Kernamine BQ-9702C from Witco Chemicals, Querton 441-BC, HBG BCL from Kenobel), benzyl behenyl dimethyl ammonium chloride (Incroquat behenyl BDQ/P from Croda Universal Inc; Kemamine Q-2802-C from Witco Chemicals), dioctyl dimethyl ammonium chloride (Querton 28CL from Lilachim), didecyl dimethyl ammonium chloride (Bio-Dac from Bio-Lab Inc, Querton 210 CL from Lilachim, Bardac 2250 from Lonza Inc, BTC 1010 from Onyx Chemicals), didecyl dimethyl ammonium bromide (Aldrich 29,801-8), dicoco dimethyl ammonium chloride (Accoquat 2C-75, Armstrong Chemical Co. Ltd., Kemamine Q-6503C, Witco, Jet Quat 2C-75, Jetco Chemicals, M-Quat 2475, Mazer, Quartamine DCP, Kao Corp., Arquad 2C-75, Akzo Chemie, Radiaquat 6462,Oleofina S.A., Variquat K300, Sherex Chemicals, Adogen 462, Sherex Chemicals), dicetyl dimethyl ammonium chloride (Adogen 432CG, Sherex Chemicals), distearyl dimethyl ammonium methyl sulfate (Varisoft 137, 190-100P from Sherex Chemicals, Arosurf TA-100 Sherex Chemicals), disoya dimethyl ammonium chloride (Arquad 2S-75 from Akzo Chemie), ditallow dimethyl ammonium chloride (Adogen 470, Sherex Chemicals), dihydrogenated tallow dimethyl ammonium methyl sulfate (Accosoft 748 from Stepan), dihydorgenated tallow dimethyl ammonium chloride (Arquad 2HT-75, Akzo Chemie, Kemamine Q-9702C, Witco, Carsosoft V-90, V-100, Lonza Inc., Adogen 442, Sherex Chemicals, Varisoft 3262, Varisoft DHT, Sherex Chemicals, Radiaquat 6442, Oleofina S.A., Jet Quat 2HT-75, Jetco Chemicals, Accosoft 707, Stepan), dibehenyl/diarachidyl dimethyl ammonium chloride (Kernamine Q-1902C, 1302C from Witco Chemicals), 1:1 blend of oleyl trimethyl ammonium chloride and dicoco dimethyl ammonium chloride (Arquad S-2C-50 from Akzo Chemie), 1:1 blend of trimethyl tallow ammonium chloride and dimethyl dicoco ammonium chloride (Arquad T-2C-50, from Akzo Chemie and Adogen R-6 from Sherex Chemicals, difatty acid isopropyl ester dimethyl ammonium methyl sulfate (Rewoquat CR 3099 from Rewo Quimica, Loraquat CR 3099 from Dutton and Reinisch), tallow dimethyl trimethyl propylene diammonium chloride (Tomah Q-D-T from Tomah), N-cetyl, N-ethyl morpholinium ethosulfate (G-263, ICI Americas), amido alkyl derivative salts such as soya amido propyl benzyl dimonium chloride (Schercoquat, SOAB, Scher Chemicals), of the formula

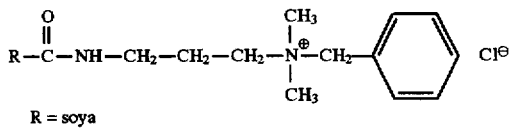

R = soya soya amido propyl ethyl dimonium ethyl sulfate (Schercoquat, SOAS, Scher Chemicals), soya dicoco quaternary ammonium chloride (Jet Quat S-2C-50, Jetco Chemicals), lauryl amidopropyl polyethylene glycol diammonium chloride phosphate (Monaquat P-TD from Mona Industries), gluconamidopropyl dimethyl-2-hydroxyethyl ammonium chloride (Quaternium 22, Ceraphyl 60, Van Dyk), of the formula

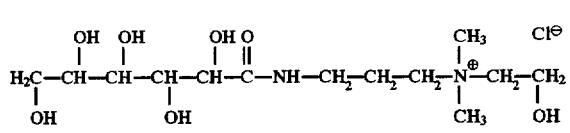

N-tallow pentamethyl propane diammonium dichloride (Adogen 477 from Sherex Chemicals), N-alkyl-N-N-dimethyl-N(dodecyl acetate) ammonium chloride, wherein alkyl has from 14 to 20 carbon atoms (Schercoquat ALA, Scher Chemicals), mink amidopopryl dimethyl-2-hydroxyethyl ammonium chloride (Quaternium 26, (Ceraphyl 65, Van Dyk), of the formula

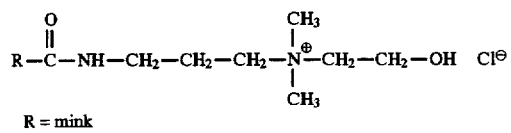

R = mink

N-rapeseed-(3-amidopropyl)-N-N-dimethyl-N-(2,3-epoxy propyl) ammonium chloride, (Schercoquat ROEP, Scher Chemicals), of the formula

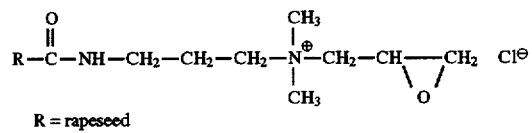

R = rapeseed

N-safflower-(3-amidopropyl)-N-N dimethyl-N-ethyl ammonium ethyl sulfate (Schercoquat SAS, Scher Chemicals), N-stearyl-(3-amido propyl)-N,N-dimethyl-N-ethyl ammonium ethyl sulfate (Schercoquat FOAS, Scher Chemicals), N-stearyl-(3-amido propyl)-N-benzyl ammonium chloride (Schercoquat SAB, Scher Chemicals, isostearamido propyl ethyl dimethyl ammonium ethosulfate (Schercoquat 1AS-LC from Scher Chemicals), N-ethyl ether-bis-1,4(N-isostearyl amido propyl-N,N-dimethyl) ammonium chloride (Schercoquat 21AE, Scher Chemicals), rapeseed amido propyl benzyl dimonium chloride (Schercoquat ROAB, Scher Chemicals), rapeseed amido propyl ethyl dimonium chloride (Schercoquat ROAS, Scher Chemicals), of the formula

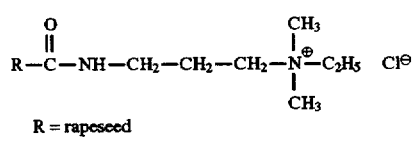

R = rapeseed ricinoleamidopropyl ethyl dimonium ethosulfate (Lipoquat R, Lipo Chemicals), 2-hydroxypropyl-bis-1,3-(N-isostearyl amido propyl-N,N-dimethyl ammonium chloride) (Schercoquat 21AP, Scher Chemicals), cocamidopropyl polyethylene glycol dimonium chloride phosphate (Monaquat P-TC from Mona Industries), and the like, as well as mixtures thereof.

Also suitable are phosphonium compounds, such as, for example, those disclosed in copending application U.S. Ser. No. 08/034,917, filed Mar. 19, 1993, the disclosure of which is totally incorporated herein by reference, including monophosphonium compounds containing one cationic phosphonium moiety, diphosphonium compounds containing two cationic phosphonium moieties, and polyphosphonium compounds containing more than two cationic phosphonium moieties. Examples of suitable phosphonium compounds include those of the formula I

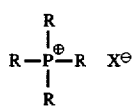

wherein R is an alkyl group, preferably with from 1 to about 35 carbon atoms, more preferably with from 1 to about 25 carbon atoms, X is an anion, and all four R groups are the same. Examples of suitable anions include $Cl^-$, $Br^-$, $I^-$, $HSO_3^-$, $SO_3^{2-}$, $CH_2SO_3^-$, $H_2PO_4^-$, $HPO_4^{2-}$, $PO_4^{3-}$, $HSO_4^-$, $SO_4^{2-}$, $NO_3^-$, $HCOO^-$, $CH_3COO^-$, $HCO_3^-$, $CO_3^{2-}$, $SCN^-$, $BF_4^-$, $ClO_4^-$, $SSO_3^-$, $CH_3SO_3^-$, $CH_3CH_2SO_3^-$, $CH_3C_6H_4SO_3^-$, $SO_3^{2-}$, $BrO_3^-$, $IO_3^-$, $ClO_3^-$, or the like. Also suitable are phosphonium compounds of the formula II

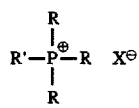

wherein R is an alkyl group, preferably with from 1 to about 25 carbon atoms, more preferably from 1 to about 18 carbon atoms, and wherein all three R groups are the same, X is an anion, R' is selected from the group consisting of alkyl groups, preferably with from 1 to about 25 carbon atoms, more preferably from 1 to about 18 carbon atoms, such as methyl, ethyl, n-propyl, isopropyl, n-butyl, isobutyl, hexyl, and the like, and including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, arylalkyl groups, preferably with from 7 to about 25 carbon atoms, more preferably with from 7 to about 19 carbon atoms, such as benzyl and the like, substituted alkyl groups, preferably with from 1 to about 25 carbon atoms, more preferably from 1 to about 18 carbon atoms, substituted arylalkyl groups, preferably with from 7 to about 25 carbon atoms, more preferably with from 7 to about 19 carbon atoms, with examples of substituents on the substituted alkyl and substituted aryl groups including hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, silyl groups, and the like. Examples of suitable anions include $Cl^-$, $Br^-$, $I^-$, $HSO_3^-$, $SO_3^{2-}$, $CH_2SO_3^-$, $H_2PO_4^-$, $HPO_4^{2-}$, $PO_4^{3-}$, $HSO_4^-$, $SO_4^{2-}$, $NO_3^-$, $HCOO^-$, $CH_3COO^-$, $HCO_3^-$, $CO_3^{2-}$, $SCN^-$, $BF_4^-$, $ClO_4^-$, $SSO_3^-$, $CH_3SO_3^-$, $CH_3CH_2SO_3^-$, $CH_3C_6H_4SO_3^-$, $SO_3^{2-}$, $BrO_3^-$, $IO_3^-$, $ClO_3^-$, or the like. Specific examples of substituted alkyl and arylalkyl groups include bromomethyl, chloromethyl, 3-bromopropyl, 3-bromobutyl, 4-bromobutyl, 2-hydroxyethyl, 2-(dimethylamino)ethyl, of the formula

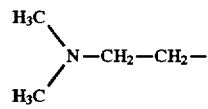

3-(dimethylamino)propyl, 3-hydroxy-2-methylpropyl, of the formula

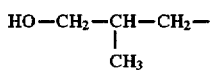

formyl methyl, of the formula

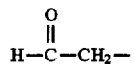

methoxy methyl ($CH_3-O-CH_2-$), acetonyl, of the formula

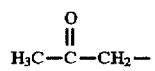

carbomethoxymethyl, of the formula

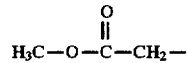

ethoxy carbonyl methyl (also called carbethoxy methyl), of the formula

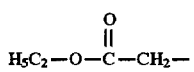

tert-butoxy carbonyl methyl, of the formula

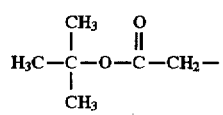

phenacyl, of the formula

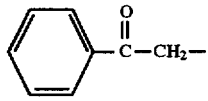

dioxane derivatives of alkyls such as 2-(1,3-dioxan-2-yl) ethyl, of the formula

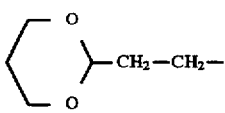

and 1,3-dioxolan-2-yl methyl, of the formula

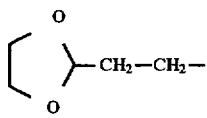

vinyl (H₂C=CH—), allyl (H₂C=CH—CH₂—), propynyl derivatives such as propargyl (HC≡C—CH₂—), 3-trimethyl silyl-2-propynyl, of the formula

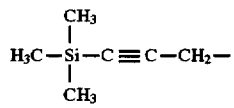

xylylene derivatives, such as p-xylylene bis (triphenyl phosphonium bromide, of the formula

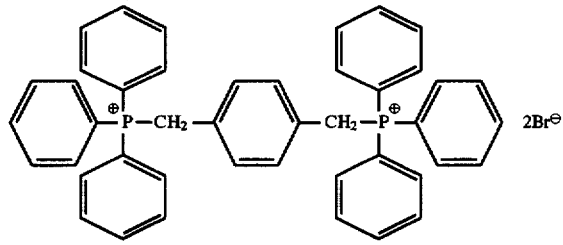

2-hydroxybenzyl, of the formula

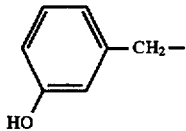

4-ethoxybenzyl, of the formula

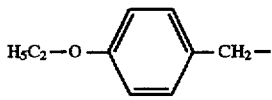

4-butoxybenzyl, and the like. Also suitable are phosphonium compounds of the formula III

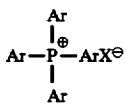

wherein Ar is an aryl group, preferably with from 6 to about 35 carbon atoms, more preferably with from 6 to about 25 carbon atoms, even more preferably with from 6 to about 18 carbon atoms, or a substituted aryl group, preferably with from 6 to about 35 carbon atoms, more preferably with from 6 to about 25 carbon atoms, even more preferably with from 6 to about 18 carbon atoms, X is an anion, and all four Ar groups are the same. Examples of suitable anions include Cl⁻, Br⁻, I⁻, HSO₃⁻, SO₃²⁻, CH₂SO₃⁻, H₂PO₄⁻, HPO₄²⁻, PO₄³⁻, HSO₄⁻, SO₄²⁻, NO₃⁻, HCOO⁻, CH₃COO⁻, HCO₃⁻, CO₃²⁻, SCN⁻, BF₄⁻, ClO₄⁻, SSO₃⁻, CH₃SO₃⁻, CH₃CH₂SO₃⁻, CH₃C₆H₄SO₃⁻, SO₃²⁻, BrO₃⁻, IO₃⁻, ClO₃⁻, or the like. Examples of suitable substituents on the substituted aryl groups include alkyl groups, preferably with from 1 to about 40 carbon atoms, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phospine groups, phosphonium groups, phospate groups, cyano groups, nitrile groups, mercapto groups, nitroso groups, halogen atoms, nitro groups, sulfone groups, acyl groups, acid anhydride groups, azide groups, silyl groups, and the like. Also suitable are phosponium compounds of the formula IV

wherein Ar is an aryl group, preferably with from 6 to about 35 carbon atoms, more preferably with from 6 to about 25 carbon atoms, even more preferably with from 6 to about 18 carbon atoms, or a substituted aryl group, preferably with from 6 to about 35 carbon atoms, more preferably with from 6 to about 25 carbon atoms, even more preferably with from 6 to about 18 carbon atoms, X is an anion, R' is as defined herein with respect to Formula II, and all three Ar groups are the same. Examples of suitable anions include Cl⁻, Br⁻, I⁻, HSO₃⁻, SO₃²⁻, CH₂SO₃⁻, H₂PO₄⁻, HPO₄²⁻, PO₄³⁻, HSO₄⁻, SO₄²⁻, NO₃⁻, HCOO⁻, CH₃COO⁻, HCO₃⁻, CO₃²⁻, SCN⁻, BF₄⁻, ClO₄⁻, SSO₃⁻, CH₃SO₃⁻, CH₃CH₂SO₃⁻, CH₃C₆H₄SO₃⁻, SO₃²⁻, BrO₃⁻, IO₃⁻, ClO₃⁻, or the like. Examples of suitable substituents on the substituted alkyl and substituted aryl groups include alkyl groups, preferably with from 1 to about 40 carbon atoms, hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, silyl groups, and the like.

Specific examples of suitable phosphonium compounds include methyl triphenyl phosphonium bromide (Aldrich 13,007-9), methyl triphenyl phosphonium iodide (Aldrich 24,505-4), ethyl triphenyl phosphonium bromide (Aldrich E5,060-4), n-propyl triphenyl phosphonium bromide (Aldrich 13,156-3), isopropyl triphenyl phosphonium iodide (Aldrich 37,748-1), cyclopropyl triphenyl phosphonium bromide (Aldrich 15,731-7), n-butyl triphenyl phosphonium bromide (Aldrich B10, 280-6), isobutyl triphenyl phosphonium bromide (Aldrich 37,750-3), hexyl triphenyl phosphonium bromide (Aldrich 30,144-2), benzyl triphenyl phosphonium chloride (Aldrich B3,280-7), bromomethyl triphenyl phosphonium bromide (Aldrich 26,915-8), chloromethyl triphenyl phosphonium chloride (Aldrich C5,762-6), 3-bromopropyl triphenyl phosphonium bromide (Aldrich 13,525-9), 3-bromobutyl triphenyl phosphonium bromide (Aldrich 30,537-5), 4-bromobutyl triphenyl phosphonium bromide (Aldrich 27,213-2), 2-dimethyl aminoethyl triphenyl phosphonium bromide (Aldrich 21,544-9), [(3-dimethyl amino) propyl] triphenyl phosphonium bromide (Aldrich 30,585-5), 2-hydroxyethyl triphenyl phosphonium bromide (Aldrich 30,413-1), (2-hydroxyethyl) triphenyl phosphonium chloride (Aldrich H3,065-8), [3-hydroxy-2-methyl propyl] triphenyl phosphonium bromide (Aldrich 32,507-4), Aldrich 32,508-2), (2-hydroxybenzyl triphenyl phosphonium bromide (Aldrich 21,629-1), (formyl methyl) triphenyl phosphonium chloride (Aldrich 30,532-4), (methoxymethyl) triphenyl phosphonium chloride (Aldrich 30,956-7), acetonyl triphenyl phosphonium chloride (Aldrich 15,807-0), carbomethoxymethyl triphenyl phosphonium bromide (Aldrich 25,906-3), (ethoxy carbonyl methyl) triphenyl phosphonium chloride (Aldrich 30,531-6), carbethoxymethyl triphenyl phosphonium bromide (Aldrich C530-0), (tert-butoxy carbonyl methyl) triphenyl phosphonium bromide (Aldrich 36,904-7), phenacyl triphenyl phosphonium bromide (Aldrich 15,133-5), (4-ethoxybenzyl) triphenyl phosphonium bromide (Aldrich 26,648-5), 4-butoxybenzyl triphenyl phosphonium bromide (Aldrich 27,489-5), 2-(1,3-dioxan-2-yl) ethyl] triphenyl phosphonium bromide (Aldrich 21,959-2), of the formula

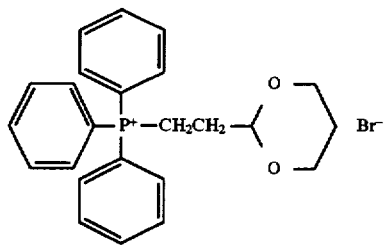

(1,3-dioxolan-2-ylmethyl) triphenyl phosphonium bromide (Aldrich 22,385-9), of the formula

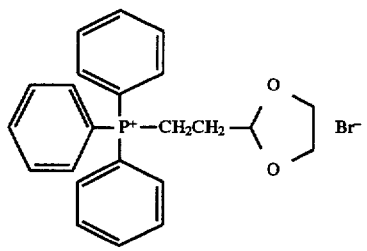

vinyl triphenyl phosphonium bromide (Aldrich 15,019-3), allyl triphenyl phosphonium bromide (Aldrich A3,660-3), allyl triphenyl phosphonium chloride (Aldrich 33,351-4), propargyl triphenyl phosphonium bromide (Aldrich 22,648-3), of the formula

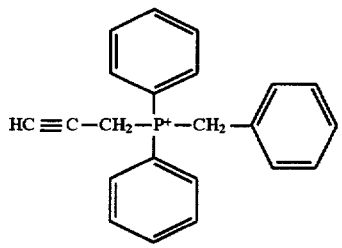

(3-trimethyl silyl-2-propynyl) triphenyl phosphonium bromide (Aldrich 29,958-8), p-xylylene bis (triphenyl phosphonium bromide) (Aldrich 112-1), tetra phenyl phosphonium bromide (Aldrich 21,878-2), tetra phenyl phosphonium chloride (Aldrich 21879-0), tetra phenyl phosphonium Iodide (Aldrich 21880-4), hexadecyl tributyl phosphonium bromide (Aldrich 27,620-0), stearyl tributyl phosphonium bromide (Aldrich 29,303-2), tetramethyl phosphonium bromide (Aldrich Chemical Co. 28,826-8), tetramethyl phosphonium chloride (Aldrich 28,827-6), tetraethyl phosphonium bromide (Aldrich 33,365-4), tetraethyl phosphonium chloride (Aldrich 32,539-2), tetraethyl phosphonium iodide (Aldrich 32,540-6), tetrabutyl phosphonium bromide (Aldrich 18,913-8), tetrabutyl phosphonium chloride (Aldrich 14,480-0), and the like, as well as mixtures thereof.

The coating composition can also, if desired, contain an optional pigment. Pigments can be present in any effective amount, and if present, typically are present in amounts of from about 1 to about 75 percent by weight of the coating composition. Examples of pigment components include zirconium oxide (SF-EXTRA available from Z-Tech Corporation), colloidal silicas, such as Syloid 74, available from Grace Company (preferably present, in one embodiment, in an amount of from about 10 to about 70 percent by weight percent), titanium dioxide (available as Rutlie or Anatase from NL Chem Canada, Inc.), hydrated alumina (Hydrad TMC-HBF, Hydrad TM-HBC, available from J.M. Huber Corporation), barium sulfate (K.C. Blanc Fix HD80, available from Kali Chemie Corporation), calcium carbonate (Microwhite Sylacauga Calcium Products), high brightness clays (such as Engelhard Paper Clays), calcium silicate (available from J.M. Huber Corporation), cellulosic materials insoluble in water or any organic solvents (such as those available from Scientific Polymer Products), blends of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, and the like, as well as mixtures thereof. Brightener pigments can enhance color mixing and assist in improving print-through in recording sheets of the present invention.

The coating composition is present on one or both surfaces of the two-ply substrate of the recording sheet of the present invention in any effective thickness. Typically, the total thickness of the coating layer is from about 0.1 to about 25 microns, and preferably from about 0.5 to 10 microns, although the thickness can be outside of these ranges.

The coating composition can be applied to the two-ply substrate by any suitable technique, such as size press treatment, dip coating, reverse roll coating, extrusion coating, or the like. For example, the coating can be applied with a KRK size press (Kumagai Riki Kogyo Co., Ltd., Nerima, Tokyo, Japan) by dip coating and can be applied by solvent extrusion on a Faustel Coater. The KRK size press is a lab size press that simulates a commercial size press. This size press is normally sheet fed, whereas a commercial size press typically employs a continuous web. On the KRK size press, the substrate sheet is taped by one end to the carrier mechanism plate. The speed of the test and the roll pressures are set, and the coating solution is poured into the solution tank. A 4 liter stainless steel beaker is situated underneath for retaining the solution overflow. The coating solution is cycled once through the system (without moving the substrate sheet) to wet the surface of the rolls and then returned to the feed tank, where it is cycled a second time. While the rolls are being "wetted", the sheet is fed through the sizing rolls by pressing the carrier mechanism start button. The coated sheet is then removed from the carrier mechanism plate and is placed on a 12 inch by 40 inch sheet of 750 micron thick Teflon for support and is dried on the Dynamic Former drying drum and held under restraint to prevent shrinkage. The drying temperature is approximately 105° C. This method of coating treats both sides of the substrate simultaneously.

In dip coating, a web of the material to be coated is transported below the surface of the liquid coating composition by a single roll in such a manner that the exposed site is saturated, followed by removal of any excess coating by the squeeze rolls and drying at 100° C. in an air dryer. The liquid coating composition generally comprises the desired coating composition dissolved in a solvent such as water, methanol, or the like. The method of surface treating the substrate using a coater results in a continuous sheet of substrate with the coating material applied first to one side and then to the second side of the substrate. The substrate can also be coated by a slot extrusion process, wherein a flat die is situated with the die lips in close proximity to the web of substrate to be coated, resulting in a continuous film of the coating solution evenly distributed across one surface of the sheet, followed by drying in an air dryer at 100° C.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. Ink jet printing processes are well known, and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference. In a particularly preferred embodiment, the printing apparatus employs a thermal ink jet process wherein the ink in the nozzles is selectively heated in an imagewise pattern, thereby causing droplets of the ink to be ejected in imagewise pattern.

Recording sheets of the present invention can be employed in printing and copying processes wherein dry or liquid electrophotographic-type developers are employed, such as electrophotographic processes, ionographic processes, or the like. Yet another embodiment of the present invention is directed to a process for generating images which comprises generating an electrostatic latent image on an imaging member in an imaging apparatus; developing the latent image with a toner; transferring the developed image to a recording sheet of the present invention; and optionally permanently affixing the transferred image to the recording sheet. Still another embodiment of the present invention is directed to an imaging process which comprises generating an electrostatic latent image on a recording sheet of the present invention; developing the latent image with a toner; and optionally permanently affixing the developed image to the recording sheet. Electrophotographic processes are well known, as described in, for example, U.S. Pat. No. 2,297,691 to Chester Carlson. Ionographic and electrographic processes are also well known, and are described in, for example, U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference.

Recording sheets of the present invention exhibit particularly low curling and good toner fix in electrophotographic applications when the substrate plies are internally reinforced with latex polymers of ethylene-vinyl acetate, acrylic copolymers, and/or styrene-butadiene copolymers in an amount of from about 5 to about 20 percent by weight, and when the substrate is surface sized with starch. In addition, when the substrate plies have high internal sizing, surface treatment with latices, blends of latices with starch, blends of starch and polyethylene oxide, or blends of hydroxypropyl cellulose and starch, when coated onto the recording sheet surface, further reduce curl and improve toner fix.

The recording sheets of the present invention can be used in any other printing or imaging process, such as printing with pen plotters, handwriting with ink pens (either aqueous or nonaqueous based inks), offset printing processes, or the like, provided that the ink employed to form the image is compatible with the material selected as the ink receiving layer of the recording sheet.

The drying time of images obtained with the recording sheets of the present invention is the time for zero image-offset and can be measured as follows: a line comprising different color sequences is drawn on the paper with droplets of inks from an ink jet printhead moving from left to right and back. Thereafter, this image is purposely smeared with the pinch roll of the printer by fast forwarding the paper mechanically while the pinch roll is on the top of the imaged line. This entire procedure takes about two seconds to complete. In the event that no offset of the printed image on the unprinted paper occurs, the drying time of the image is considered as less than two seconds.

The recording sheets of the present invention exhibit little or no blocking. Blocking refers to the transfer of ink or toner from a printed image from one sheet to another when recording sheets are stacked together. The recording sheets of the present invention exhibit substantially no blocking under, for example, environmental conditions of from about 20 to about 80 percent relative humidity and at temperatures of about 80° F.

Further, the recording sheets of the present invention exhibit high resistance to humidity. Resistance to humidity generally is the capacity of a recording sheet to control the blooming and bleeding of printed images, wherein blooming represents intra-diffusion of dyes and bleeding represents inter-diffusion of dyes. The blooming test can be performed by printing a bold filled letter such as "T" on a recording sheet and placing the sheet in a constant environment chamber preset for humidity and temperature. The vertical and horizontal spread of the dye in the letter "T" is monitored periodically under a microscope. Resistance to humidity limit is established when the dyes selected begin to diffuse out of the letter "T". The bleeding test is performed by printing a checker board square pattern of various different colors and measuring the inter-diffusion of colors as a function of humidity and temperature.

The Hercules size values recited herein were measured on the Hercules sizing tester (available from Hercules Incorporated) as described in TAPPI STANDARD T-530 pm-83, issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined (80 percent) percentage of its original reflectance.

Recording sheets of the present invention exhibit reduced curl upon being printed with aqueous inks, particularly in situations wherein the ink image is dried by exposure to microwave radiation. Recording sheets of the present invention also exhibit reduced curl upon being imaged in an electrophotographic imaging apparatus, usually exhibiting curl values of less than about 10 millimeters in apparatus such as the Xerox® 5760 color copier. Generally, the term "curl" refers to the distance between the base line of the arc formed by recording sheet when viewed in cross-section across its width (or shorter dimension—for example, 8.5 inches in an 8.5×11 inch sheet, as opposed to length, or longer dimension—for example, 11 inches in an 8.5×11 inch sheet) and the midpoint of the arc. To measure curl, a sheet can be held with the thumb and forefinger in the middle of one of the long edges of the sheet (for example, in the middle of one of the 11 inch edges in an 8.5×11 inch sheet) and the arc formed by the sheet can be matched against a pre-drawn standard template curve.

The edge raggedness values recited in the present application were measured using an Olympus microscope equipped with a camera capable of enlarging the recorded ink jet images. The edge raggedness value is the distance in millimeters for the intercolor bleed on a checkerboard pattern.

The optical density measurements and the print through values recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I 420 grams of fiber mixture containing 75 percent by weight of hardwood and 25 percent by weight of softwood fiber were beaten for 15 minutes in a Valley beater (TMI #72-13-01, available from Testing Machine Inc.), drained and then disintegrated in a British/Tappi Standard Pulp Disintegrator #SE 003, available from Lorentzen and Wettre. The resulting slurry was diluted to 0.4 percent solids and then enriched with sodium chloride (0.25 percent by weight of the total solution), AKD alkaline sizing (0.2 percent by weight of the fiber), Stalock 600 (0.5 percent by weight of the fiber), and calcium carbonate (15.0 percent by weight of the fiber) and mixed. Paper sheets were formed on a centrifugal dynamic sheet former (DSF), pressed between felt and dried at 100° C. on the DSF dryer, and cut to 8.5×11 inches sheets that weighed about 35 grams per square meter. These sheets, having Hercules sizing values of 25 seconds each, were bonded together using Neoprene latex as the bonding adhesive in a thickness of 5 microns (dry) by applying a pressure of 60 psi at 100° C. for a period of 3 minutes in a Fibertech STFI Sheet Dryer available from Lindquist Business Development Corporation. The resulting sheets, which were 100 microns in thickness, were treated on a KRK size press with a solution wherein the solids comprised 45 percent by weight starch, 5 percent by weight quaternary polymer Mirapol-9, 45 percent by weight calcium carbonate pigment, and 5 percent by weight zirconium oxide pigment, wherein the solids were present in an amount of 5 percent by weight in the water solution. After the sized two-ply paper sheets were dried at 105° C., they had a thickness of 106 microns and a Hercules sizing degree of 75 seconds. The sheets thus formed were fed into a Xerox® 5775 color copier and images were obtained which exhibited optical density values of greater than 1 and excellent toner fix (greater than 95 percent), and the imaged sheets exhibited acceptable curl of 25 millimeters. For comparison purposes, a Xerox® 4024 DP paper, when fed in to the Xerox® 5775 color copier and imaged, exhibited a curl value of 50 millimeters and a toner fix of 90 percent.

EXAMPLE II 420 grams of fiber mixture containing 75 percent by weight of hardwood and 25 percent by weight of softwood fiber were beaten for 15 minutes in a Valley beater (TMI #72-13-01 available from Testing Machine Inc.), drained and then disintegrated in a British/Tappi Standard Pulp Disintegrator #SE 003, available from Lorentzen and Wettre. The resulting slurry was diluted to 0.4 percent solids and then enriched with 9.6 grams of calcium carbonate, 0.4 grams of Sta-lok 600, 0.2 grams of Nal Size 7540, and 1.2 grams of latex 76 RES4100 (styrene-butadiene copolymer) and mixed. Paper sheets were formed on a centrifugal dynamic sheet former (DSF), pressed between felt and dried at 100° C. on the DSF dryer, and cut to 8.5×11 inches sheets that weighed about 35 grams per square meter. These sheets, having Hercules sizing values of 10 seconds each, were bonded together using Airflex-400 latex (ethylene-vinylacetate copolymer) as the bonding adhesive in a thickness of 5 microns (dry) by applying a pressure of 60 psi at 100° C. for a period of 3 minutes in a Fibertech STFI Sheet Dryer available from Lindquist Business Development Corporation. The resulting sheets, which were 100 microns in thickness, were treated on a KRK size press with a solution wherein the solids comprised 45 percent by weight starch, 5 percent by weight quaternary polymer Mirapol-9, 45 percent by weight calcium carbonate pigment, and 5 percent by weight zirconium oxide pigment, wherein the solids were present in an amount of 5 percent by weight in the water solution. After the sized two-ply paper sheets were dried at 105° C., they had a thickness of 106 microns and a Hercules sizing degree of 50 seconds. The sheets thus formed were fed into a Xerox® 5775 color copier and images were obtained which exhibited optical density values of greater than 1 and excellent toner fix (greater than 97 percent), and the imaged sheets exhibited acceptable curl of 15 millimeters. For comparison purposes, a Xerox® 4024 DP paper, when fed in to the Xerox® 5775 color copier and imaged, exhibited a curl value of 50 millimeters and a toner fix of 90 percent.

EXAMPLE III 420 grams of fiber mixture containing 75 percent by weight of hardwood and 25 percent by weight of softwood fiber were beaten for 15 minutes in a valley beater, drained and then disintegrated in a British/Tappi Standard Pulp Disintegrator #SE 003, available from Lorentzen and Wettre. The resulting slurry was diluted to 0.4 percent solids and then enriched with 9.6 grams of calcium carbonate, 0.4 grams of Stalok 600, 0.2 grams of NaI Size 7540, and 1.2 grams of latex 76 RES4100 (styrene-butadiene copolymer) and mixed. Paper sheets were formed on a centrifugal dynamic sheet former (DSF), pressed between felt and dried at 100° C. on the DSF dryer, and cut to 8.5×11 inches sheets that weighed about 35 grams per square meter. These sheets, having Hercules sizing values of 5 seconds each, were bonded together using Rhoplex P-376 latex as the bonding adhesive in a thickness of 5 microns (dry) by applying a pressure of 60 psi at 100° C. for a period of 3 minutes in a Fibertech STFI Sheet Dryer available from Lindquist Business Development Corporation. The resulting sheets, which were 100 micron in thickness, were treated on a KRK size press with a solution wherein the solids contained 5 percent by weight hydroxypropylmethyl cellulose, 10 percent by weight polyvinylalcohol, 5 percent by weight quaternary polymer acrylic latex Interpol-HX42-1, 65 percent by weight calcium carbonate pigment, and 15 percent by weight silica pigment, wherein the solids were present in an amount of 5 percent by weight in the water solution. After the sized two-ply paper sheets were dried at 105° C., they had a thickness of 110 microns and a Hercules sizing degree of 25 seconds. The sheets thus formed were fed into a Xerox® 4020 color ink jet printer and images were obtained which dried in less than 2 seconds with optical density values of 1.25 (black), 1.20 (magenta), 1.30 (cyan), and 0.90 (yellow) before washing, and 1.20 (black), 1.18 (magenta), 1.30 (cyan), and 0.88 (yellow) after washing with hot water (about 50° C.) for two minutes. The edge raggedness values were measured at 0.20 (between black and yellow), 0.35 (between cyan and yellow), 0.25 (between magenta and yellow), and 0.40 (between magenta and cyan) with a print through value of 0.045.

EXAMPLE IV

The recording sheets prepared in Example III were incorporated into a Hewlett-Packard 500-C color ink jet printer containing inks of the following compositions:

Cyan: 20 percent by weight ethylene glycol, 2.5 percent by weight benzyl alcohol, 1.9 percent by weight ammonium chloride, 0.1 percent by weight Dowicil 150 biocide, obtained from Dow Chemical Co., Midland, Mich., 0.05 percent by weight polyethylene oxide (molecular weight 18,500), obtained from Union Carbide Co.), 30 percent by weight Projet Cyan 1 dye, obtained from ICI, 45.45 percent by weight water.

Magenta: 20 percent by Weight ethylene glycol, 2.5 percent by weight benzyl alcohol, 1.9 percent by weight ammonium chloride, 0.1 percent by weight Dowicil 150 biocide, obtained from Dow Chemical Co., Midland, Mich., 0.05 percent by weight polyethylene oxide (molecular weight 18,500), obtained from Union Carbide Co.), 2.5 percent by weight Triton Direct Red 227, obtained from Tricon, 72.95 percent by weight water.

Yellow: 20 percent by weight ethylene glycol, 2.5 percent by weight benzyl alcohol, 1.9 percent by weight ammonium chloride, 0.1 percent by weight Dowicil 150 biocide, obtained from Dow Chemical Co., Midland, Mich., 0.05 percent by weight polyethylene oxide (molecular weight 18,500), obtained from Union Carbide Co.), 3 percent by weight Hoechst Duasyn Brilliant Yellow SF-GL VP220, obtained from Hoechst, 72.45 percent by weight water.

Images were generated by printing 80 percent solid area using the magenta, cyan, and yellow inks. The recording sheets exhibited a curl value of 20 millimeters after 7 days at 50% humidity and 23.5° C. temperature. Under identical conditions of printing, Courtland papers showed exhibited values of greater than 127 millimeters.

EXAMPLE V

The process of Example II is repeated except that in the paper slurry the styrene-butadiene latex 76RES 4100 is replaced with ethylene-vinyl acetate latex Airflex 400. It is believed that similar results will be observed.

EXAMPLE VI

The process of Example II is repeated except that in the paper slurry the styrene-butadiene latex 76RES 4100 is replaced with acrylic latex Rhoplex P-376. It is believed that similar results will be observed.

Other embodiments and modifications of the present invention may occur to those skilled in the art subsequent to a review of the information presented herein, these embodiments and modifications, as well as equivalents thereof, are also included within the scope of this invention.

What is claimed is:

1. A recording sheet which comprises (a) a substrate comprising a first paper ply, a second paper ply, and, situated between and in contact with the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment.

2. A recording sheet according to claim 1 wherein at least one of the first and second plies contains in the fibers therein a latex polymer selected from the group consisting of ethylene-vinyl acetate latices, acrylic copolymer latices, styrene-butadiene latices, and mixtures thereof.

3. A recording sheet according to claim 1 wherein the hydrophobic adhesive layer comprises a polymer capable of forming a latex.

4. A recording sheet according to claim 1 wherein the hydrophobic adhesive layer comprises a polymer selected from the group consisting of rubber latices, polyester latices, vinyl chloride homopolymer latices, ethylene-vinyl chloride copolymer emulsions, polyvinyl acetate homopolymer emulsions, carboxylated vinyl acetate homopolymer emulsion resins, vinyl acetate copolymer latices, vinyl acrylic terpolymer latices, acrylic homopolymer emulsion latices, polystyrene homopolymer latices, styrene-butadiene copolymer latices, butadiene-acrylonitrile copolymer latices, butadiene-acrylonitrile-styrene terpolymer latices, and mixtures thereof.

5. A recording sheet according to claim 1 wherein the adhesive layer has a thickness of from about 1 to about 10 microns.

6. A recording sheet according to claim 1 wherein the adhesive layer has a thickness of from about 5 to about 10 microns.

7. A recording sheet according to claim 1 wherein the substrate has a thickness of from about 50 to about 150 microns.

8. A recording sheet according to claim 1 wherein the first ply and the second ply each have a thickness of from about 15 to about 125 microns.

9. A recording sheet according to claim 1 wherein the polymeric binder is selected from the group consisting of hydroxypropylmethyl cellulose, polyvinyl alcohol, starch, and mixtures thereof.

10. A recording sheet according to claim 1 wherein the image receiving coating contains a pigment.

11. A recording sheet according to claim 1 wherein the image receiving coating contains a pigment selected from the group consisting of calcium carbonate, zirconium oxide, silica, and mixtures thereof.

12. A recording sheet according to claim 1 wherein the dye fixative is a quaternary acrylic copolymer latex.

13. A recording sheet according to claim 1 wherein the dye fixative is a quaternary acrylic copolymer latex of the formula

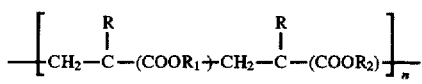

wherein n is a number of from about 10 to about 100, R is hydrogen or methyl, $R_1$ is hydrogen, an alkyl group, or an aryl group, and $R_2$ is $N^+(CH_3)_3 X^-$, wherein X is an anion, and the degree of quaternization is from about 1 to about 100 percent.

14. A recording sheet according to claim 1 wherein the dye fixative is a monoammonium compound.

15. A recording sheet according to claim 1 wherein the dye fixative is a monoammonium compound of the formula

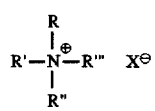    I wherein R is an alkyl group, R', R", and R'" are each independently selected from the group consisting of alkyl groups, substituted alkyl groups, aryl groups, substituted aryl groups, arylalkyl groups, and substituted arylalkyl groups, and X is an anion.

16. A recording sheet according to claim 1 wherein the dye fixative is a phosphonium compound.

17. A recording sheet according to claim 1 wherein the dye fixative is a phosphonium compound selected from the group consisting of those of the formula I

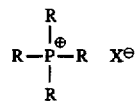    I wherein R is an alkyl group, X is an anion, and all four R groups are the same, those of the formula II

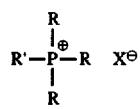    II wherein R is an alkyl group, all three R groups are the same, R' is selected from the group consisting of alkyl groups, substituted alkyl groups, aryl groups, substituted aryl groups, arylalkyl groups, and substituted arylalkyl groups, and X is an anion, those of the formula III

    III wherein Ar is an aryl group or a substituted aryl group, all four Ar groups are the same, and X is an anion, those of the formula IV

    IV wherein Ar is an aryl group or a substituted aryl group, all three Ar groups are the same, R' is selected from the group consisting of alkyl groups, substituted alkyl groups, aryl groups, substituted aryl groups, arylalkyl groups, and substituted arylalkyl groups, and X is an anion, and mixtures thereof.

18. A recording sheet according to claim 1 wherein the image receiving coating has a thickness of from about 0.1 to about 25 microns.

19. A painting process which comprises incorporating into an ink jet printing apparatus containing an aqueous ink a recording sheet which comprises (a) a substrate comprising a first paper ply, a second paper ply, and, situated between and in contact with the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment, and causing droplets of the ink to be ejected in an imagewise pattern onto the recording sheet, thereby generating images on the recording sheet.

20. A printing process according to claim 19 wherein the printing apparatus employs a thermal ink jet process wherein the ink in the nozzles is selectively heated in an imagewise pattern, thereby causing droplets of the ink to be ejected in imagewise pattern.

21. A process for generating images which comprises generating an electrostatic latent image on an imaging member in an imaging apparatus; developing the latent image with a toner; transferring the developed image to a recording sheet which comprises (a) a substrate comprising a first paper ply, a second paper ply, and, situated between and in contact with the first and second plies, a hydrophobic adhesive layer; (b) an image receiving coating situated on at least one surface of the substrate, said image receiving coating being suitable for receiving images of an aqueous ink and suitable for receiving images of an electrostatic toner composition, said coating comprising (1) a polymeric binder, (2) a dye fixative, and (3) an optional pigment; and optionally permanently affixing the transferred image to the recording sheet.

* * * * *